US011196703B2

(12) United States Patent
Kölhi et al.

(10) Patent No.: US 11,196,703 B2
(45) Date of Patent: Dec. 7, 2021

(54) CONNECTING RADIO BASE STATIONS VIA A THIRD PARTY NETWORK

(71) Applicant: Telefonaktiebolaget LM Ericsson (publ), Stockholm (SE)

(72) Inventors: Johan Kölhi, Vaxholm (SE); Lars Hallström, Vaxholm (SE); Tomas Thyni, Järfälla (SE); Annikki Welin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/917,384

(22) PCT Filed: Sep. 9, 2013

(86) PCT No.: PCT/EP2013/068634
§ 371 (c)(1),
(2) Date: Mar. 8, 2016

(87) PCT Pub. No.: WO2015/032452
PCT Pub. Date: Mar. 12, 2015

(65) Prior Publication Data
US 2016/0219017 A1 Jul. 28, 2016

(51) Int. Cl.
*H04L 29/12* (2006.01)
*H04W 76/10* (2018.01)
(Continued)

(52) U.S. Cl.
CPC ...... *H04L 61/1511* (2013.01); *H04L 61/2015* (2013.01); *H04L 61/2503* (2013.01);
(Continued)

(58) Field of Classification Search
CPC combination set(s) only.
See application file for complete search history.

(56) References Cited

U.S. PATENT DOCUMENTS

2005/0021603 A1* 1/2005 Yokomitsu ........ H04L 29/12047
709/203
2007/0214232 A1 9/2007 Belimpasakis et al.
(Continued)

FOREIGN PATENT DOCUMENTS

| CN | 101292501 A | 10/2008 |
| EP | 1 515 505 A1 | 3/2005 |
| RU | 2 407 244 C1 | 12/2010 |

OTHER PUBLICATIONS

International Preliminary Report on Patentability issued in corresponding International application No. PCT/EP2013/068634, dated Mar. 15, 2016, 8 pages.
(Continued)

*Primary Examiner* — Yemane Mesfin
*Assistant Examiner* — Mon Cheri S Davenport
(74) *Attorney, Agent, or Firm* — Rothwell, Figg, Ernst & Manbeck, P.C.

(57) ABSTRACT

There is provided a radio base station suitable for a wireless communications network. The radio base station is arranged to request a local IP address from a DHCP server the request including a local port number. The radio base station is further arranged to receive a response from the DHCP server comprising a local IP address, an external IP address and port forwarding information. The radio base station is also arranged to send a service record update to a DNS server, the service record update comprising the service capability information of the radio base station, the external IP address, and the port forwarding information.

20 Claims, 5 Drawing Sheets

(51) Int. Cl.
*H04W 12/069* (2021.01)
*H04W 88/16* (2009.01)

(52) U.S. Cl.
CPC ......... *H04L 61/256* (2013.01); *H04W 12/069* (2021.01); *H04W 76/10* (2018.02); *H04W 88/16* (2013.01)

(56) References Cited

U.S. PATENT DOCUMENTS

| | | | |
|---|---|---|---|
| 2007/0297430 A1* | 12/2007 | Nykanen | H04L 63/029 370/408 |
| 2008/0159312 A1* | 7/2008 | Tuononen | H04L 29/12367 370/401 |
| 2009/0141705 A1 | 6/2009 | Mosker | |
| 2010/0278108 A1* | 11/2010 | Cho | H04W 76/12 370/328 |
| 2012/0010521 A1* | 1/2012 | Maki | H04W 12/06 600/538 |
| 2012/0110100 A1* | 5/2012 | Hiramatsu | H04L 61/2575 709/206 |

OTHER PUBLICATIONS

International Search Report issued in International application No. PCT/EP2013/068634, dated May 27, 2014, 3 pages.
Gulbrandsen, A. et al. "A DNS RR for specifiying the location of services (DNS SRV)," Network Working Group, RFC 2782 The Internet Society, Feb. 2000, 12 pages.
Alexander, S., and R. Droms, "DHCP Options and BOOTP Vendor Extensions," Network Working Group; Request for Comments: 2132; Obsoletes: 1533; Category: Standards Track, Mar. 1997, 34 pages.
Droms, R., "Dynamic Host Configuration Protocol," Network Working Group; Request for Comments: 2131; Obsoletes 1541; Category: Standards Track, Mar. 1997, 40 pages.
Mockapetris, P., "Domain Names—Concepts and Facilities," Network Working Group; Obsoletes: RFCs 882, 883, 973, RFC 1034, Nov. 1987, 55 pages.
Chinese Search Report issued in corresponding Chinese Application No. 2013/800794870, dated Apr. 24, 2018, (2 pages).
Official Decision of Grant dated Feb. 19, 2018 issued in Russian Patent Application No. 2016113280. (17 pages).

* cited by examiner

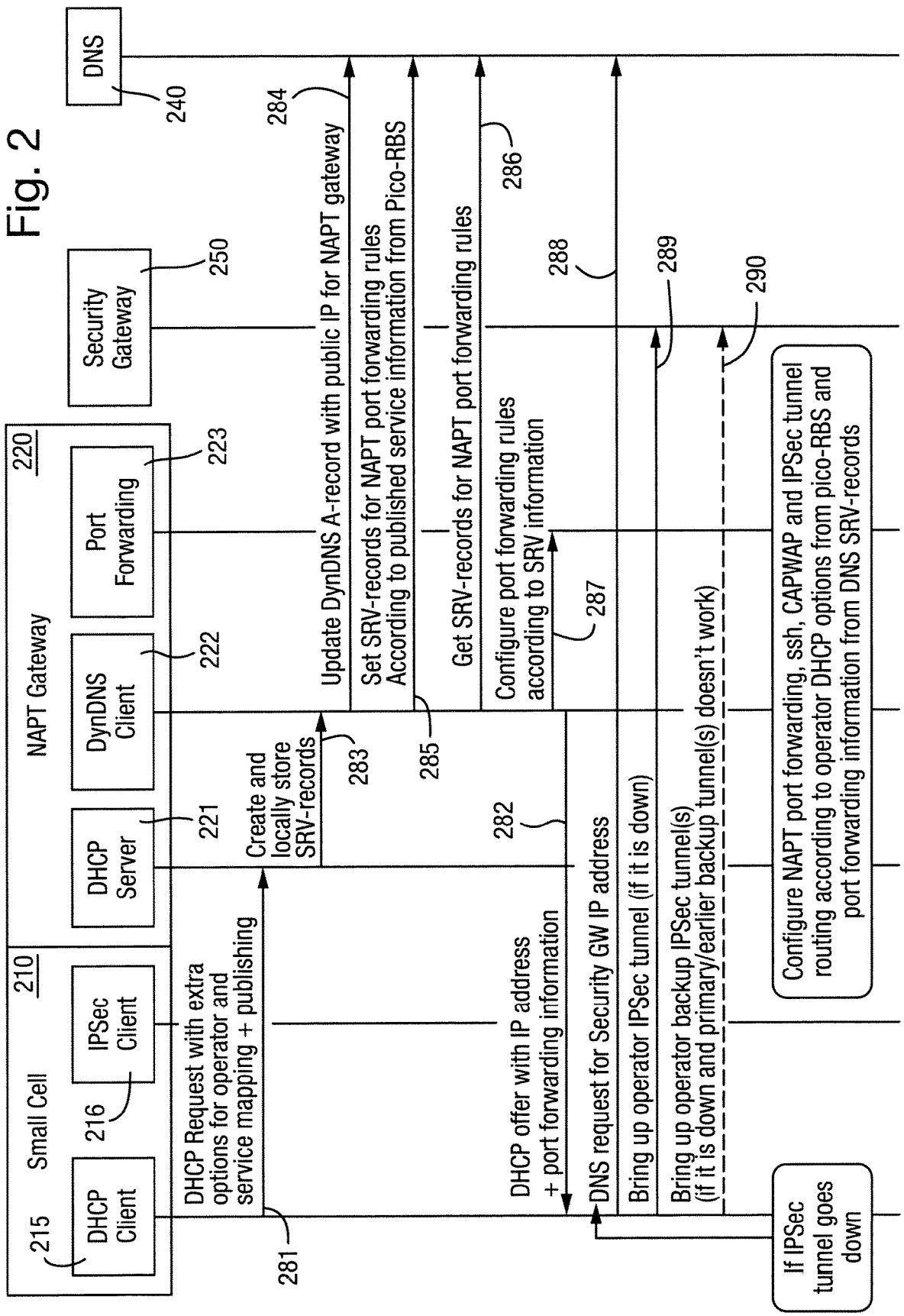

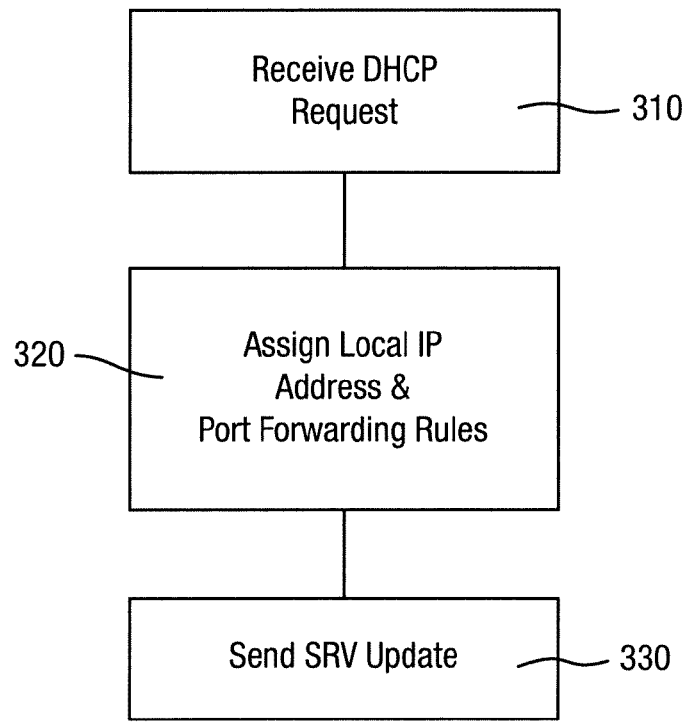
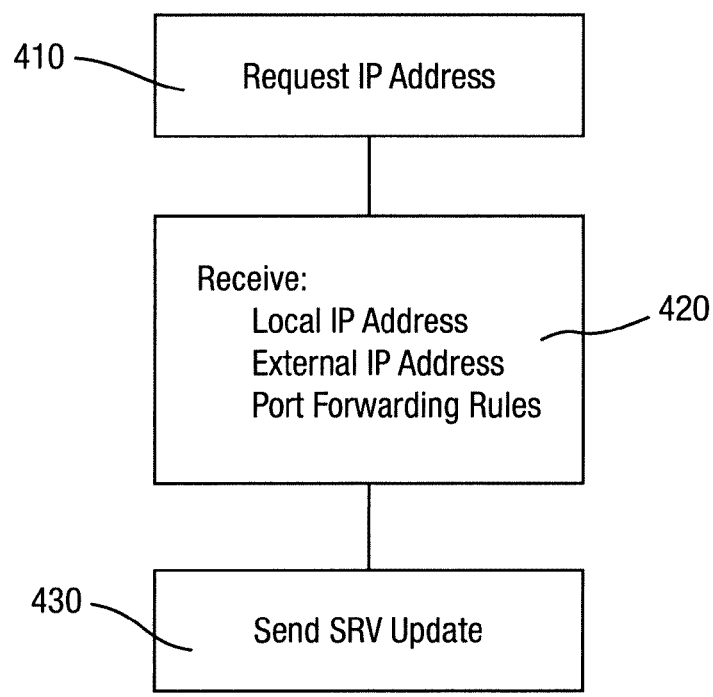

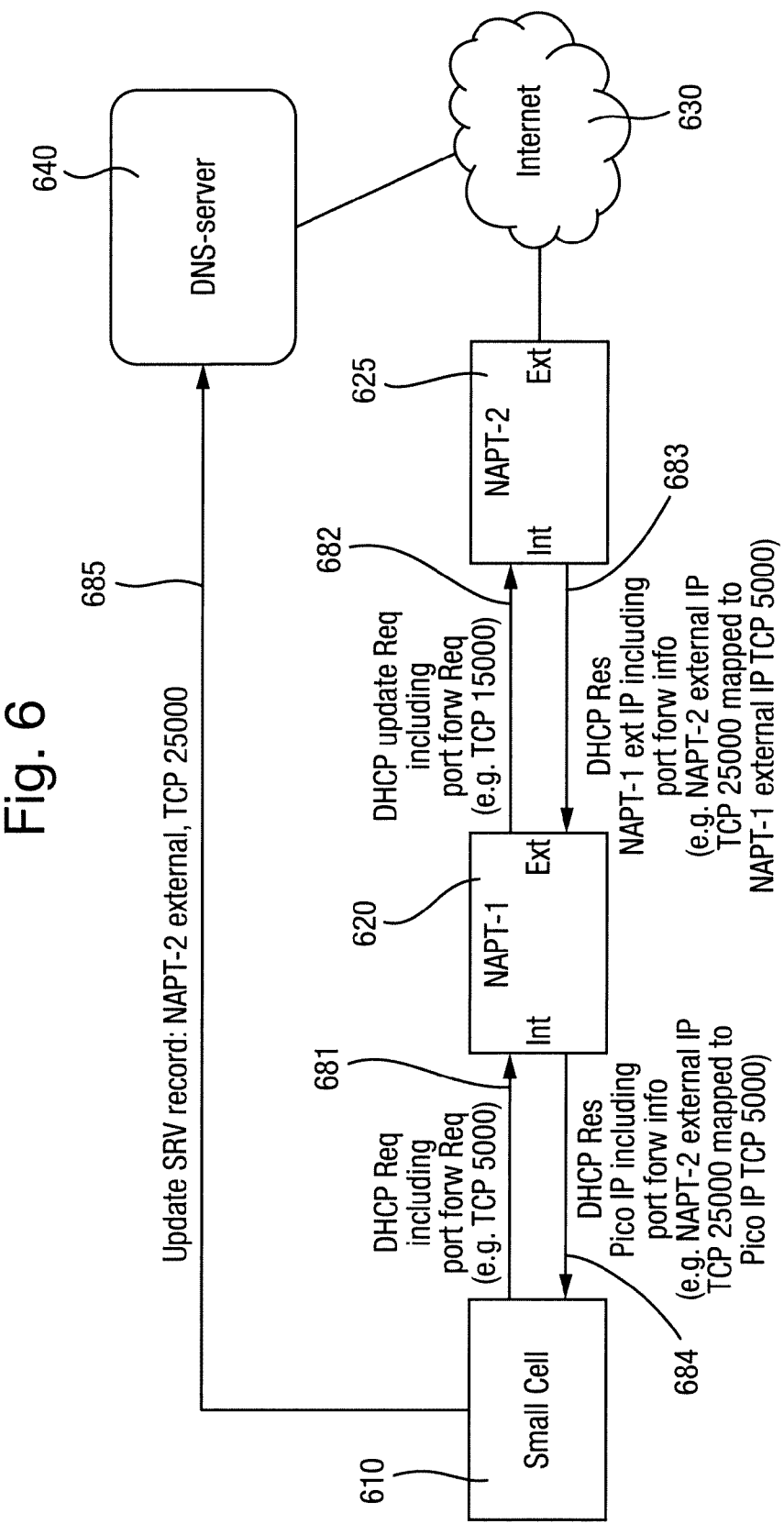

US 11,196,703 B2

CONNECTING RADIO BASE STATIONS VIA A THIRD PARTY NETWORK

CROSS REFERENCE TO RELATED APPLICATION(S)

This application is a 35 U.S.C. § 371 National Phase Entry Application from PCT/EP2013/068634, filed Sep. 9, 2013, designating the United States, the disclosure of which is incorporated by reference.

TECHNICAL FIELD

The present application relates to a radio base station, a method in a radio base station, a Network Address and Port Translation (NAPT) gateway, a method in a NAPT gateway, and a computer-readable medium.

BACKGROUND

Wireless communication networks comprising a plurality of cells have become ubiquitous, and are sometimes known as cellular communications networks. Small cells for such wireless communications networks have for some time had the potential to be very useful, and with the suitability of small cell sizes to LTE, their importance will increase. However, to date the deployment of small cells has been limited.

The typical range of a standard base station may be up to 35 kilometres, this is known as a macrocell. Small cells cover much smaller areas. A typical use for small cells is to increase connectivity in small areas which are not served well by macrocells. There are a plurality of types of small cell, broadly classified according to the area they are expected to serve: a microcell has a range of less than two kilometers, a picocell has a range of 200 meters or less, and a femtocell has a range of the order of 10 meters.

A problem with small cells is that to be useful an operator needs to deploy a lot of them, but configuring and maintaining a lot of small cells is simply not practical with present implementations. One reason for this is that small cells are generally not connected directly to the operator's network. Instead, the back haul for a small cell is provided over a third party network, typically the internet and likely via a local area network (LAN). The back haul may be provided by a network run and owned by another operator.

Presently, a small cell must be registered with the network and given an IP address so that it can be accessed via the internet in order to allow a network operator to locate and communicate with the small cell, and to communicate with any client devices that are using the small cell to connect to the operator's network. Such a registration or set-up process must be done each time a small cell is installed, replaced, or breaks. This makes small cells high maintenance and high cost which is a disincentive to their adoption and deployment.

This connectivity problem is most prevalent for small cells, but it applies to any radio base station that connects to its operator via a third party network. As such, this problem also applies to macrocells. For example, two operators may share a remote cell tower, both running a macro cell form the site. To save costs one operator may run a back haul connection from the site for their macrocell; that operator allowing the other operator to lease capacity on the connection to provide back haul for the other macrocell.

SUMMARY

There is provided a radio base station suitable for a wireless communications network. The radio base station is arranged to request a local IP address from a DHCP server, the request including a local port number. The radio base station is further arranged to receive a response from the DHCP server comprising a local IP address, an external IP address and port forwarding information. The radio base station is also arranged to send a service record update to a DNS server, the service record update comprising the service capability information of the radio base station, the external IP address, and the port forwarding information.

It is already known that radio base station deployment behind NAT or NAPT gateways can be done by using tunneling techniques, but these rely on the small RBS being able to establish a tunnel through the NAT gateway. If the tunneling fails for any reason a technician must attend the site to fix the connection. This problem is addressed in the above radio base station by enabling port forwarding in the NAT gateway to allow for connection from the outside to the small RBS, and at the same time creating a DNS record defining how it can be reached. Further, this process is initiated when the radio base station is first connected or if it is power cycled, and so can be considered to be fully automated.

The radio base station may be further arranged to create a service record update, and sending this service record update to the DNS server. The service record update may cause a new service record to be created at the DNS sever.

The radio base station may be further arranged to send a request for external IP address information and port forwarding information to the DHCP server. The request may comprise a DHCP Option message. The request may comprise a DHCP Information message. The request may be initially sent to a DHCP relay node. The DHCP relay node may be a NAPT gateway.

The local port number sent with the request for a local IP address may be a port to which the radio base station is arranged to receive communications from an external server. The local port number sent with the request for a local IP address is a local port number for the port forwarding. The local port number sent with the request for a local IP address is a local port number for which the radio base station requires port forwarding.

The radio base station may be further arranged to perform authentication with a server via the internet. The server may be operated by the manufacturer of the radio base station. The authentication may use a serial number and pre-shared key installed on the radio base station at manufacture, or at distribution. The server may be operated by the operator of the wireless communications network.

The radio base station may be further arranged to establish a secure connection to a security gateway of a wireless communications network. The secure connection may be an IP security (IPsec) tunnel.

The radio base station may be a small base station for the wireless communications network. The radio base station may be a macrocell, microcell, a picocell, or a femtocell.

There is further provided a radio base station suitable for a wireless communications network. The radio base station comprises a radio transceiver, a network connection, a processor, and a memory. The radio transceiver is for sending and receiving wireless communications signals. The network connection is for connecting to a local area network. The memory contains instructions executable by said processor whereby said radio base station is operative to request a local IP address from a DHCP server the request including a local port number. Said radio base station further operative to receive a response from the DHCP server comprising a local IP address, an external IP address and port forwarding information. Said radio base station further operative to send a service record update to a DNS server, the service record update comprising the service capability information of the radio base station, the external IP address, and the port forwarding information.

The radio base station may be suitable for communication with an operator network over a third party network.

There is further provided a method in a radio base station suitable for a wireless communications network. The method comprises requesting a local IP address from a DHCP server the request including a local port number.

The method comprises receiving a response from the DHCP server comprising a local IP address, an external IP address and port forwarding information. The method comprises sending a service record update to a DNS server, the service record update comprising the service capability information of the radio base station, the external IP address, and the port forwarding information.

The method may further comprise sending a request of external IP address information and port forwarding information to the DHCP server. The request may comprise a DHCP Option message. The request may comprise a DHCP Information message. The request may be initially sent to a DHCP relay node. The DHCP relay node may be a NAPT gateway.

The local port number sent with the request for a local IP address may be a port to which the radio base station is arranged to receive communications from an external server. The local port number sent with the request for a local IP address is a local port number for the port forwarding. The local port number sent with the request for a local IP address is a local port number for which the radio base station requires port forwarding.

The method may further comprise performing authentication with a server via the internet. The server may be operated by the manufacturer of the radio base station. The authentication may use a serial number and pre-shared key installed on the radio base station at manufacture, or at distribution. The server may be operated by the operator of the wireless communications network.

The method may further comprise establishing a secure connection to a security gateway of a wireless communications network. The secure connection may be an IP security (IPsec) tunnel. The radio base station may be suitable for communication with an operator network over a third party network.

The radio base station may be a small base station for the wireless communications network. The radio base station may be a microcell, a picocell, or a femtocell.

There is further provided a Network Address and Port Translation (NAPT) gateway. The NAPT gateway arranged to receive a DHCP request, service capability information and a port number from a radio base station, the radio base station suitable for a wireless communications network. The NAPT gateway further arranged to assign a local IP address to the radio base station including port forwarding rules. The NAPT gateway further arranged to send a service record update to a DNS server, the service record update comprising the service capability information of the radio base station, the port forwarding rules associated with the radio base station, and the external IP address of the NAPT gateway.

It is already known that radio base station deployment behind NAT or NAPT gateways can be done by using tunneling techniques, but these rely on the small RBS being able to establish a tunnel through the NAT gateway. If the tunneling fails for any reason a technician must attend the site to fix the connection. This problem is addressed in the above NAPT gateway by enabling ports in the NAT gateway to allow for connection from the outside to the small RBS, and at the same time creating a DNS record defining how the radio base station can be reached.

The service record update may cause a new service record to be created at the DNS sever. The radio base station may be suitable for communication with an operator network over a third party network.

The NAPT gateway may be arranged to send a service record update to a DNS server in response to identifying that a device that has connected to the NAPT gateway is a radio base station suitable for a wireless communications network. A device may be identified as being a radio base station suitable for a wireless communications network from the service capability information. A device may be identified as being a radio base station suitable for a wireless communications network if it requests the port forwarding rules from the NAPT gateway.

The NAPT gateway may be further arranged to receive connections from a plurality of radio base stations. The NAPT gateway may be connected to a further NAPT gateway, the further NAPT gateway having an external IP address.

There is further provided a radio base station suitable for a wireless communications network, the radio base station comprising a NAPT gateway described herein.

There is further provided a method in a NAPT gateway. The method comprises receiving a DHCP request, service capability information and a port number from a radio base station, the radio base station suitable for a wireless communications network. The method comprises assigning a local IP address to the radio base station including port forwarding rules. The method further comprises sending a service record update to a DNS server, the service record update comprising the service capability information of the radio base station, the port forwarding rules associated with the radio base station, and the external IP address of the NAPT gateway.

There is further provided a computer-readable medium, carrying instructions, which, when executed by computer logic, causes said computer logic to carry out any of the methods defined herein. There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

BRIEF DESCRIPTION OF THE DRAWINGS

A method and apparatus for connecting radio base stations via a third party network will now be described, by way of example only, with reference to the accompanying drawings, in which:

FIG. 2 is a signaling diagram illustrating the process described herein;

FIG. 3 illustrates the method performed in the NAPT Gateway described herein;

FIG. 4 illustrates an alternative method as performed in a small cell;

FIG. 6 illustrates small cell which connects to the internet via a first NAPT Gateway which is itself behind a second NAPT Gateway.

DETAILED DESCRIPTION

A cause of complexity for the installation and maintenance of certain radio base stations (RBS), or cells, has been identified by the inventors to be the configuration of network port address translation mappings. Such mappings are necessary for an RBS to use a back haul connection via a third party network.

A limited number of IP addresses are available, and IPv4 address exhaustion has been anticipated for some decades now. This problem is addressed using network address translation (NAT), and network address and port translation (NAPT). (Although there are differences between NAT and NAPT, those differences are beyond the scope of this document and herein the terms will be used interchangeably.)

Network Address Translation (NAT) is the process of modifying IP address information in IPv4 headers while in transit across a traffic routing device. The simplest type of NAT provides a one-to-one translation of IP addresses. In this type of NAT only the IP addresses, IP header checksum and any higher level checksums that include the IP address are changed. The rest of the packet is left untouched. However, it is also common to hide an entire IP address space, usually consisting of a plurality of private IP addresses, behind a single IP address in another (usually public) address space. Typically the private address space is a local area network and the public address space is the Internet. To avoid ambiguity in the handling of returned packets, a one-to-many NAT must alter higher level information such as TCP/UDP ports in outgoing communications and must maintain a translation table so that return packets can be correctly translated back. This type of NAT can be referred to as a NAPT.

Figure 1:
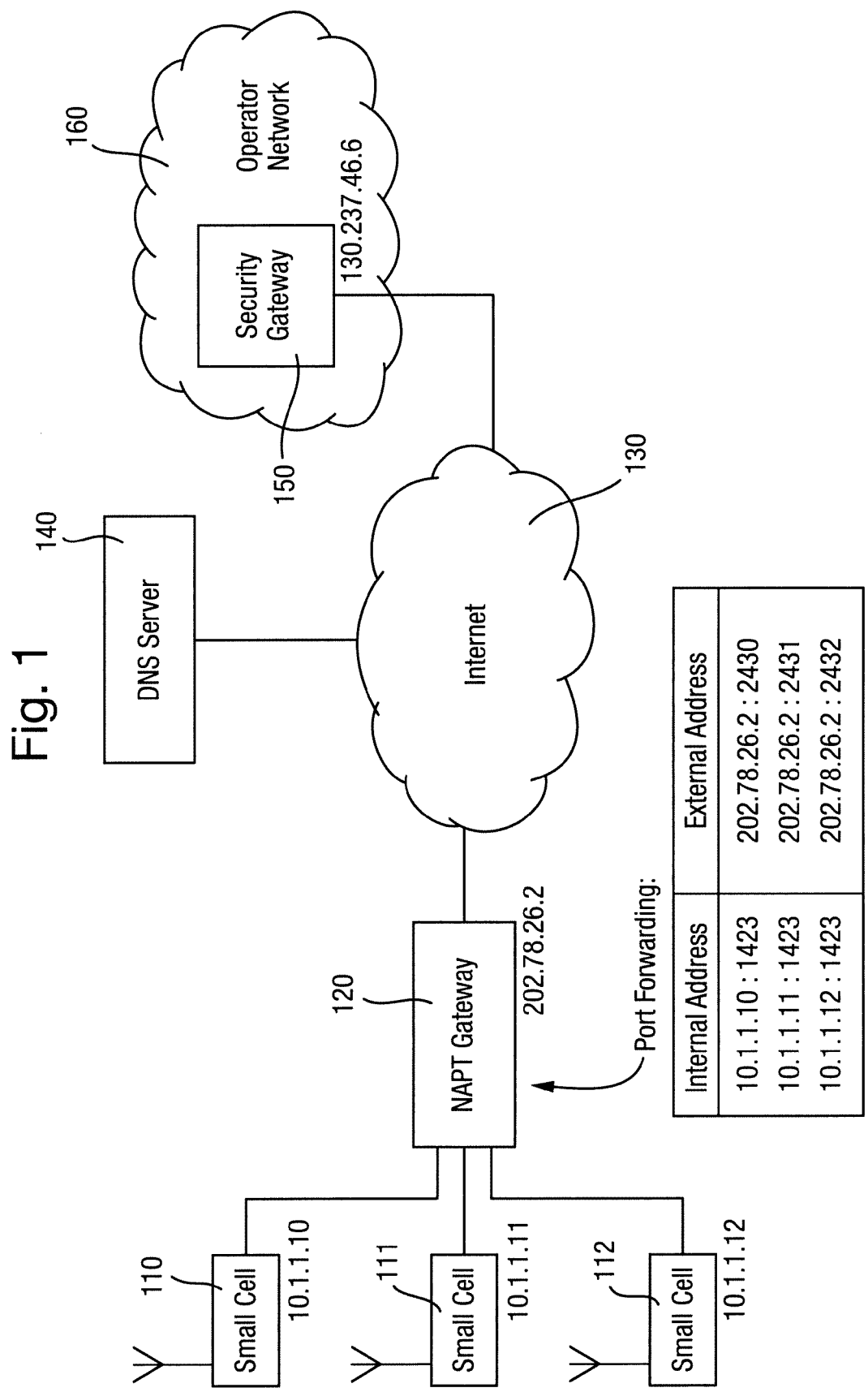
FIG. 1 illustrates an example of a deployment of three small cells.

FIG. 1 illustrates an example of a deployment of three small cells. These three cells 110, 111, 112 connect to the internet 130 via a NAPT Gateway 120 which uses NAPT port forwarding translation. Because the small cells connect via the NAPT Gateway, they are said to be behind the NAPT device, and there they can use local (or internal) IP-addresses, in this case 10.1.1.10, 10.1.1.11, 10.1.1.12. The NAPT Gateway 120 comprises a port forwarding table that records the mapping between local and external IP addresses.

In the Example of FIG. 1, The NAPT Gateway 120 has an external IP address of 202.78.26.2. This is the IP address by which packets are sent to the NAPT Gateway across the internet 130. The operator network 160 is connected to the internet 130 by a security gateway 150. The external IP address of the security gateway 150 is 130.237.46.6. The NAPT Gateway 120 ensures that communications from small cell 110 are delivered to the operator network 160 and that replies are delivered to the same small cell 110. The function of the Domain Name System (DNS) server 140 will be described in detail later.

Most systems using NAT do so in order to enable multiple hosts on a private network to access the Internet using a single public IP address. Network address translation has serious drawbacks in terms of the quality of Internet connectivity and requires careful attention to the details of its implementation.

In particular, all types of NAT break the originally envisioned model of IP end-to-end connectivity across the Internet and NAPT makes it difficult for systems behind a NAT to accept incoming communications.

The methods and apparatus described herein achieves automatic configuration of a NAPT (Network Address Port Translation) Gateway 120 to allow the small cells behind the NAPT Gateway to receive incoming communications form the operator network 160.

Two examples will be described, the first involves a modified NAPT Gateway, the second involves a modified RBS. Both examples require the automatic creation of a DNS record for the small cell, the DNS record listing the small cells capabilities, and the port forwarding information required to reach it from an external location, traversing the NAPT Gateway.

According to the first example a modified NAPT Gateway device service capability information from a small cell when the small cell first connects to it. The NAPT Gateway reports this service capability information to a DNS server. The DNS server can thus report and make available the small cell's service capability. Via the DNS registration each small RBS can be accessed from the internet. So for example, each small cell can receive a communication initiated from the operator network.

The method described herein is highly suitable for small cell RBS deployments behind a NAPT gateway as part of a large scale network, but can also be used wherever automatic configuration of port forwarding is needed and where the initial connection is of an untrusted type. Securing communications over untrusted links can be done with public key encryption, the implementation via IPSec is well known. The methods described herein will work with such existing ways of securing devices, identity and communication. To achieve this each small cell is installed with a unique private encryption key at manufacture.

It should be noted that merely implementing a DHCP server that allows a plurality of small cells to share a single internet connection (and associated IP address), would not create a workable solution. The operator network must be able to connect to each small cell directly, and must be able to learn that functionality or service capability of each small cell connected thereto.

Radio base station (RBS) deployment behind NAT gateways already exists and uses VPN tunneling techniques, but this relies on the small cell being able to establish a tunnel through the NAT gateway. If that tunnel fails for any reason a technician must attend the site, which is costly. The arrangements described herein address this issue by enabling ports in the NAT gateway to allow for connection from the outside to the small cell, and at the same time creating a DNS record of how the small cell can be reached.

Existing NAPT setup requires manual configuration of static mapping tables and fixed IP addresses in nodes behind the address translation function. This is impractical for most deployments, and restricts the adoption of small cells.

FIG. 2 is a signaling diagram illustrating the process described herein. The following systems are relevant to the operation of this method.

The Domain Name System (DNS) is a hierarchical distributed naming system for computers, services, or any resource connected to the Internet or a private network. DNS, associates various information with domain names assigned to each of the participating entities. A Domain Name Service resolves queries for these names into IP addresses for the purpose of locating computer services and devices worldwide.

A Service record (SRV record) is a specification of data in the Domain Name System defining the location, i.e. the hostname and port number, of servers for specified services.

The Dynamic Host Configuration Protocol (DHCP) is a network protocol that is used to configure network devices so that they can communicate on an IP network. A DHCP client uses the DHCP protocol to acquire configuration information, such as an IP address, a default route and one or more DNS server addresses from a DHCP server. The DHCP client then uses this information to configure itself. Once the configuration process is complete, the DHCP client is able to communicate on the internet.

FIG. 2 shows a small cell 210 comprising a DHCP client 215 and a IPSec Client 216. FIG. 2 also shows a NAPT Gateway 220 comprising a DHCP server 221, a DynDNS Client 222 and a Port Forwarder 223. FIG. 2 also shows a security Gateway 250 which is part of an operator network (not shown), and a DNS server 240.

At 281 the small cell 210 is connected to a local area network. The DHCP client 215 sends a DHCP request to the DHCP server 221. The DHCP request includes DHCP options, which are available in the DHCP standard. The DHCP options used here include the service capability of the small cell.

At 283 the DHCP server forwards the service details received with the DHCP request to the DynDNS Client 222, which uses this information to create a local SRV record for the small cell 210. Then the DynDNS client 222 communicates with the DNS server 240. The DynDNS client 222 updates a DynDNS A-record with a public IP address at 284; it sets the SRV record to include the NAPT port forwarding rules according to the service information received from the small cell at 285; and it retrieves SRV records for the NAPT port forwarding rules at 286.

Then at 287, the DynDNS client 222 initiates the port forwarder 223 to configure and implement port forwarding rules for the small cell 210 according to the service information for the small cell 210. At 282 the DHCP server 221 sends a DHCP offer to the DHCP client 215, this includes the local IP address assigned to the small cell 210.

Now, the operator network can locate the small cell 210 via its DNS record and initiate communication with it.

In normal operation, once the above setup is complete, the small cell 210 attempts to initiate connection to the operator network. This begins by the Small cell 210 contacting the DNS server 240 to request the IP address of the security Gateway 250 of the operator network. Once the small cell 210 has this, it brings up an IPSec tunnel to the security gateway 250. The IPSec tunnel provides secure communication between the small cell 210 and the operator network via the internet.

If the IPSec tunnel goes down for any reason, then at 290 the small cell 210 attempts to re-initiate communication with the operator network. Should that fail then the operator network can look up the DNS record for the small call 210 and initiate communication with it.

FIG. 3 illustrates the method performed in the NAPT Gateway described herein. At 310 the NAPT gateway receives a DHCP request, service capability information and a port number from a small cell. At 320 the NAPT Gateway assigns a local IP address to the small cell including port forwarding rules. At 330 the NAPT Gateway sends a service record update to a DNS server, the service record update comprising the service capability information of the small cell, the port forwarding rules associated with the small cell, and the external IP address of the NAPT gateway. Thus, ports are enabled in the NAPT gateway to allow for connection from the outside to the small RBS, and at the same time a DNS record is created defining how the small cell can be reached.

Therefore there is provided a modified NAPT gateway. The NAPT Gateway finds an available external port(s) and this is assigned together with the NAT gateway external IP address and the DHCP lease time for the internal IP address to the small cell base station. This is also used in the DynDNS SRV record registration or update sent by the NAPT Gateway. So The DynDNS does not need to wait for the first packet to be sent or send keep-alive packet to maintain the port translating mapping state, since it is semi-permanent (at least until the DHCP lease time expires).

In the second example, the DNS update is made by the small cell itself, instead of the NAPT Gateway. The process is substantially the same as that shown in FIG. 2, except that the small cell 210 requests the port forwarding information from the NAPT Gateway, and then sends the SRV update itself.

The alternative method as performed in the small cell is illustrated in FIG. 4. At 410 the small cell requests a local IP address from the DHCP server; the DHCP request includes a local port number. Using a DHCP option message, the small cell also requests the external IP address of the NAPT Gateway. At 420 the small cell receives a response from the DHCP server comprising a local IP address, an external IP address and port forwarding information. Using this information, at 430, the small cell sends a service record update to a DNS server, the service record update comprises the service capability information of the small cell, the external IP address, and the port forwarding information.

The local port number sent with the request for a local IP address is the port to which the small cell is arranged to receive communications from an external server.

Once the service record update is sent to the DNS server, the small cell will performing authentication with an operator security gateway as described above.

Figure 5:
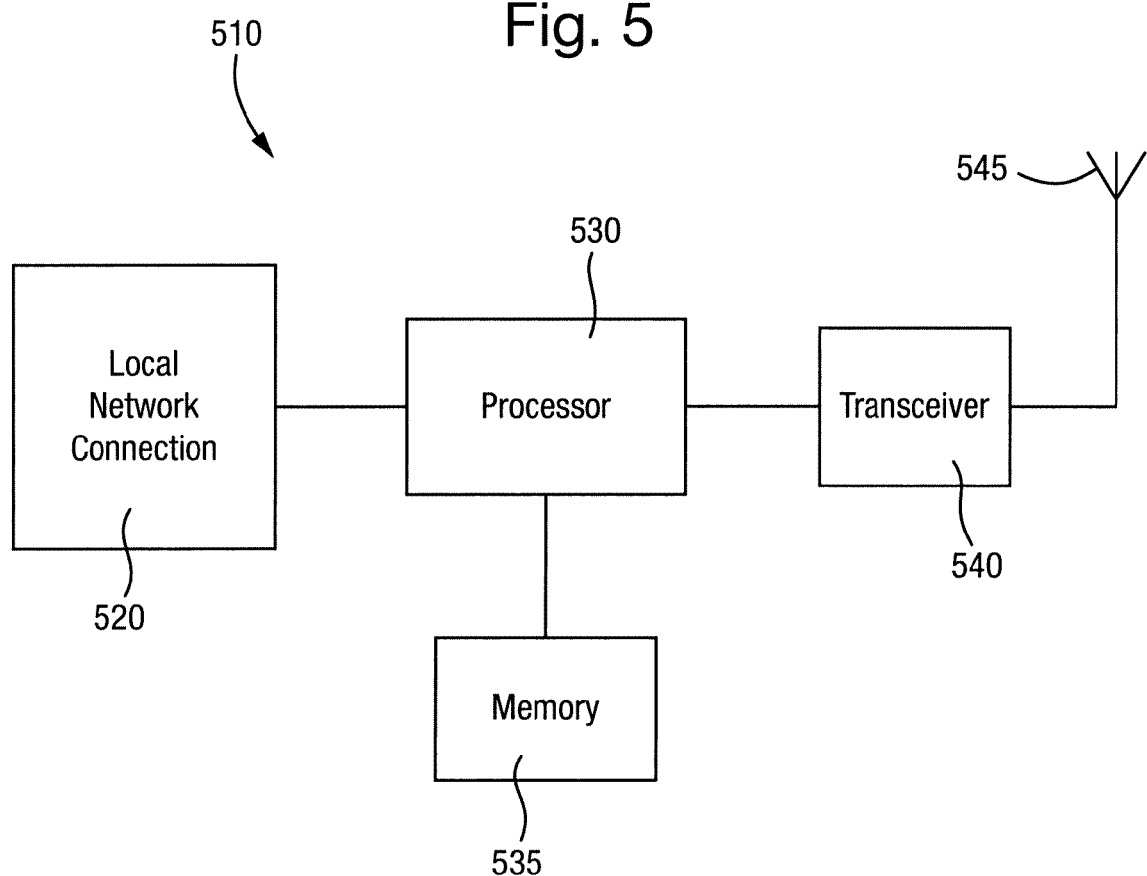
FIG. 5 illustrates a small cell as described herein.

FIG. 5 illustrates a small cell 510 as described herein. The small cell comprises a local network connection 520 such as an Ethernet port. This is arranged to communicate with a local area network. The small cell further comprises a processor 530, and a memory 535. The processor 530 is arranged to receive instructions which, when executed, causes the processor 530 to carry out the above described method. The instructions may be stored on the memory 535. The small cell 510 further comprises a transceiver 540 for send and receiving radio signals to at least one wireless communications device, and an antenna 545 for transmission and reception of radio signals.

The functionality of the creation of the DNS service record may be built into a small cell. Alternatively, it could be provided by a router-type device which a plurality of small cells connect to. The router-type device may comprise a NAPT Gateway connected to the main network either directly, via the public internet, or by some dedicated connection.

FIG. 6 illustrates small cell 610 arranged to update a DNS service record, which connects to the internet 630 via a first NAPT Gateway 620 which is itself behind a second NAPT Gateway 625. At 681 the small cell 610 sends a DHCP request to the first NAPT 620, the request including a port forwarding request. In this case the small cell 610 request's port forwarding to its local TCP port 5000 (could be UDP or other protocol ports as well) in the initial DHCP request or in a DHCP update sent towards the first NAPT 620.

Since the first NAPT Gateway 620 is also behind a NAPT, at 682, the first NAPT Gateway 620 sends a DHCP update request to the second NAPT Gateway 625. A DHCP update is sent because the first NAPT Gateway 620 already has an active IP address. The DHCP update includes the request for port mapping for the small cell's port TCP 5000. Since TCP port 5000 is already in use on the external side of the first NAPT Gateway 620, the first NAPT Gateway 620 must select an unused port, in this case TCP port 15000 towards the second NAPT Gateway 625.

The second NAPT Gateway 625 take a free port on the external interface, in this case TCP port 25000 and at 683 it sends a response to the first NAPT Gateway 620. The response at 683 includes the external IP address and port assigned by the second NAPT 625. At 684 this is forwarded from first NAPT Gateway 620 to the small cell 610.

Each NAPT must also create the states between the external IP/Port and the next device NAPT or small cell. At 685, the small cell 610 can then update the SRV record using dynamic DNS. Subsequently it can then be reached using the second NAPT Gateways 625 external IP/port number. The states are also timed-out in case the lease time for DHCP expires. The small cell 610 does not need to know the mapping between first NAPT Gateway 620 and second NAPT Gateway 625.

For completeness, the installation process for a small cell radio base station (RBS) will now be described. It is impractical for small cell RBSs to have any operator specific information when they ship from the factory, and not even when they leave the warehouse. The methods and apparatus described herein allow an RBS to be installed without any need to install a server address into it first.

At installation a serial number of the RBS is scanned from a barcode on it and that is registered for the relevant operator at the manufacturer's server by the installation technician. After installation and at first boot, each small RBS will connect to the manufacturer's server (authenticated using a pre-installed certificate). This means that the only information the small cell RBS needs is its serial number and a certificate for establishing secure communications with the manufacturer's server. This information is installed upon manufacture of the small cell RBS and no other information is input to the small RBS prior to or during installation.

Upon installation and start-up, the small cell RBS connects to the manufacturer's server and identifies itself using the same identity information as was contained in the previously registered barcode picture. The manufacturer's server looks up the registration information for that RBS and then downloads some particular additional information the RBS. That particular additional information may comprise an operator certificate and an address of the operators secure gateway. This information allows the small RBS to establish a secure communication with the operator's server in the appropriate operator network for it to register and begin operation.

The method and apparatus described herein achieves self-organizing behavior of new small cells. The small cells come with just factory settings, but through the invention they can boot up and join an existing operator network in a secure way. Changes in the operators' network configuration can be easily deployed, either by triggering a new DNS SRV lookup and changing the NAPT configuration. Larger reconfigurations can be deployed by a reboot. This will make the node rejoin the network and get the new configuration during startup.

This allows automation of the deployment resulting in decreased cost. A small cell or NAPT gateway as described herein is very easy to implement, and essentially provides automatic configuration of networks that incorporate multiple small cells behind the NAPT gateway and yet still gives the Pico cells access both to and from Internet. Further, this allows several operators (or service providers) to share the same transport infrastructure and NAPT Gateway, although the devices from each operator would need different port forwarding rules and manual configuration per operator.

The procedures described herein enables "out of band" configuration in deployment scenario. "Out of band" meaning that the local network where the small cell RBS's are deployed can be owned by another network operator or landlord.

Further information regarding SRV records can be found at http://tools.ietf.org/html/rfc2782. Further information regarding DNS can be found at http://tools.ietf.org/html/rfc1034. Further information regarding DHCP can be found at http://www.ietf.org/rfc/rfc2131.txt. Further information regarding DHCP options can be found at http://tools.ietf.org/html/rfc2132

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The above examples have been described in the context of a small cell being connected to an operator network over an Internet connection. It will be appreciated that the method and apparatus described herein may be applied to any radio base station, including a macrocell, which connects to an operator network via a third party network. The third party network could be any private network, and may include a network operated by a different network operator.

Further, while examples have been given in the context of particular communications standards, these examples are not intended to be the limit of the communications standards to which the disclosed method and apparatus may be applied. For example, while specific examples have been given in the context of LTE, the principles disclosed herein can also be applied to any WCDMA system, other wireless communication system, and indeed any communication system which uses device states.

The invention claimed is:

1. A radio base station (RBS) suitable for a wireless communications network, the radio base station arranged to:
    transmit to a Dynamic Host Configuration Protocol (DHCP) server a DHCP message requesting that the DHCP server assign to the RBS a local Internet Protocol (IP) address, the DHCP message including a local port number, wherein the RBS is configured to listen on the local port number for incoming packets;
    receive a DHCP response message transmitted by the DHCP server as a response to the DHCP message, the DHCP response message transmitted by the DHCP server comprising: (i) a local IP address, (ii) an external IP address assigned to a gateway, and (iii) a second port number, wherein the gateway is configured to listen on the second port number for incoming packets; and send a service record update to a DNS server, the service record update comprising: service capability information of the radio base station, the external IP address, and the second port number.

2. The radio base station of claim 1, wherein the gateway is a Network Address and Port Translation (NAPT) gateway, and the NAPT gateway is configured to map a first IP address and port combination to a second IP address and port combination, wherein the first IP address and port combination consists of the external IP address assigned to the NAPT gateway and the second port number and the second IP address and port combination consists of the local IP address and the first port number.

3. The radio base station of claim 1, wherein the radio base station is further arranged to perform authentication with a server via the internet.

4. The radio base station of claim 1, wherein the radio base station is further arranged to establish a secure connection to a security gateway.

5. The radio base station of claim 1, wherein the radio base station is a small base station for the wireless communications network.

6. A radio base station (RBS) suitable for a wireless communications network, the RBS comprising:

a radio transceiver for sending and receiving wireless communications signals;

a network connection for connecting to a local area network; and a processor and a memory, said memory containing instructions executable by said processor, wherein said RBS is operative to:

transmit to a Dynamic Host Configuration Protocol (DHCP) server a DHCP message requesting that the DHCP server assign to the RBS a local Internet Protocol (IP) address, the DHCP message including a local port number, wherein the RBS is configured to listen on the local port number for incoming packets;

receive a DHCP response message transmitted by the DHCP server, the DHCP response message comprising a local IP address, an external IP address assigned to a gateway, and a second port number, wherein the gateway is configured to listen on the second port number for incoming packets; and send a service record update to a DNS server, the service record update comprising:

service capability information of the radio base station, the external IP address, and the second port number.

7. The radio base station of claim 6, wherein the gateway is a Network Address and Port Translation (NAPT) gateway, and the NAPT gateway is configured to map a first IP address and port combination to a second IP address and port combination, wherein the first IP address and port combination consists of the external IP address assigned to the NAPT gateway and the second port number and the second IP address and port combination consists of the local IP address and the first port number.

8. A method in a radio base station (RBS) suitable for a wireless communications network, the method comprising:

transmitting to a Dynamic Host Configuration Protocol (DHCP) server a DHCP message requesting that the DHCP server assign to the RBS a local Internet Protocol (IP) address, the DHCP message including a local port number, wherein the RBS is configured to listen on the local port number for incoming packets;

receiving a DHCP response message transmitted by the DHCP server, the DHCP response message comprising a local IP address, an external IP address assigned to a gateway, and a second port number, wherein the gateway is configured to listen on the second port number for incoming packets; and transmitting a service record update to a DNS server, the service record update comprising: service capability information of the radio base station, the external IP address, and the second port number.

9. A Network Address and Port Translation (NAPT) gateway arranged to:

receive a Dynamic Host Configuration Protocol (DHCP) message transmitted by a radio base station (RBS), the DHCP message requesting that a DHCP server assign to the RBS a local Internet Protocol (IP) address, and the DHCP message including a local port number, wherein the RBS is configured to listen on the local port number for incoming packets;

assign a local IP address to the RBS;

send to the RBS a DHCP response message responsive to the DHCP message, the DHCP response message comprising the assigned local IP address, an external IP address of the NAPT gateway, and a second port number, wherein the NAPT gateway is configured to listen on the second port number for incoming packets; and send a service record update to a Domain Name System (DNS) server, the service record update comprising the service capability information of the RBS, the second port number, and the external IP address of the NAPT gateway.

10. The NAPT gateway of claim 9, wherein the NAPT gateway is arranged to send a service record update to a DNS server in response to identifying that a device that has connected to the NAPT gateway is a radio base station suitable for a wireless communications network.

11. The NAPT gateway of claim 9, wherein the NAPT gateway is further configured such that after assigns the local IP address to the RBS the NATP is configured to generate the DHCP response message.

12. The NAPT gateway of claim 9, wherein the NAPT gateway is connected to a further NAPT gateway, the further NAPT gateway having an external IP address.

13. The NAPT gateway of claim 9, wherein the NAPT gateway is further configured to map a first IP address and port combination to a second IP address and port combination, wherein the first IP address and port combination consists of the external IP address of the NAPT gateway and the second port number and the second IP address and port combination consists of the assigned local IP address and the first port number.

14. A method in a Network Address and Port Translation (NAPT) gateway, the method comprising:

receiving a Dynamic Host Configuration Protocol (DHCP) message transmitted by a radio base station (RBS), the DHCP message requesting that a DHCP server assign to the RBS a local Internet Protocol (IP) address, and the DHCP message including a local port number, wherein the RBS is configured to listen on the local port number for incoming packets;

assigning a local IP address to the RBS;

sending to the RBS a DHCP response message responsive to the DHCP message, the DHCP response message comprising the assigned local IP address, an external IP address of the NAPT gateway, and a second port number, wherein the NAPT gateway is configured to listen on the second port number for incoming packets; and sending a service record update to a Domain Name System (DNS) server, the service record update comprising the service capability information of the RBS, the second port number, and the external IP address of the NAPT gateway.

15. A computer program product comprising a non-transitory computer-readable medium storing instructions, which, when executed by computer logic, causes said computer logic to carry out the method of claim 8.

16. The method of claim 14, further comprising the NAPT gateway, after assigning the local IP address to the RBS, generating the DHCP response message.

17. The method of claim 14, further comprising the NAPT gateway mapping a first IP address and port combination to a second IP address and port combination, wherein the first IP address and port combination consists of the external IP address of the NAPT gateway and the second port number and the second IP address and port combination consists of the assigned local IP address and the first port number.

18. The method of claim 17, further comprising:
the NAPT gateway receiving a packet comprising the first IP address and port combination;
the NAPT gateway modifying the received packet, wherein the modifying comprises the NAPT gateway replacing the first IP address and port combination with the second IP address and port combination; and
the NAPT gateway transmitting the modified packet towards the RBS.

19. The NAPT gateway of claim 13, wherein the NAPT gateway is further configured such that when the NAPT gateway receives a packet comprising the first IP address and port combination the NAPT gateway modifies the packet by replacing the first IP address and port combination with the second IP address and port combination and then transmits the modified packet towards the RBS.

20. The method of claim 8, wherein
the gateway is a Network Address and Port Translation (NAPT) gateway, and
the NAPT gateway is configured to map a first IP address and port combination to a second IP address and port combination, wherein the first IP address and port combination consists of the external IP address assigned to the NAPT gateway and the second port number and the second IP address and port combination consists of the local IP address and the first port number.

* * * * *